US011135937B2

(12) United States Patent
Ward et al.

(10) Patent No.: US 11,135,937 B2
(45) Date of Patent: Oct. 5, 2021

(54) VEHICLE CHARGING LEVERAGING TELECOMMUNICATION INFRASTRUCTURE

(71) Applicant: Cisco Technology, Inc., San Jose, CA (US)

(72) Inventors: David Ward, Los Gatos, CA (US); Michael John Beesley, Atherton, CA (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 16/211,406

(22) Filed: Dec. 6, 2018

(65) Prior Publication Data

US 2019/0308520 A1    Oct. 10, 2019

Related U.S. Application Data

(60) Provisional application No. 62/654,159, filed on Apr. 6, 2018.

(51) Int. Cl.
| | |
|---|---|
| *G01C 22/00* | (2006.01) |
| *B60L 53/65* | (2019.01) |
| *G05D 1/02* | (2020.01) |
| *G01C 21/34* | (2006.01) |
| *G06N 20/00* | (2019.01) |

(Continued)

(52) U.S. Cl.
CPC ............ *B60L 53/65* (2019.02); *B60L 53/12* (2019.02); *G01C 21/34* (2013.01); *G05D 1/0212* (2013.01); *G06N 20/00* (2019.01); *H02J 7/025* (2013.01); *H04L 63/10* (2013.01);
(Continued)

(58) Field of Classification Search
CPC ...... B60L 53/65; B60L 53/12; B60L 2240/60; B60L 53/66; B60L 53/68; G05D 1/0212; G05D 2201/0213; G01C 21/34; G01C 21/3407; G01C 22/00; G06N 20/00; H04L 63/10; H02J 7/025; H02J 7/00032; H02J 50/10; B60Y 2300/91; B60Y 2200/91
USPC ................ 701/22, 24, 426, 439; 705/5, 412; 706/46
See application file for complete search history.

(56) References Cited

U.S. PATENT DOCUMENTS

| | | | |
|---|---|---|---|
| 7,844,370 B2 * | 11/2010 | Pollack ..................... | H02J 3/38 700/291 |
| 8,866,436 B2 * | 10/2014 | Lowenthal .............. | B60L 53/00 320/104 |

(Continued)

OTHER PUBLICATIONS

Daan van Put, et al., "Alternative Connections for Public EV Charging Points—Using existing Municipal Grid Connections and Objects for the installation of Public EV Charging Points", 44 pages, Jun. 2016, Utrecht University / EV Consult.

*Primary Examiner* — Shardul D Patel
(74) *Attorney, Agent, or Firm* — Behmke Innovation Group; Kenneth J. Heywood; James J. Wong

(57) ABSTRACT

In some embodiments, an electric vehicle sends a vehicle charging request to a supervisory service. The electric vehicle receives, from the supervisory service in response to the vehicle charging request, a location of a telecommunication node of a telecommunication network that is configured to provide charging to electric vehicles. The electric vehicle navigates to the received location of the telecommunication node. The vehicle initiates charging of the electric vehicle at the location of the telecommunication node.

17 Claims, 9 Drawing Sheets

(51) Int. Cl.
  *H04L 29/06* (2006.01)
  *H02J 7/02* (2016.01)
  *B60L 53/12* (2019.01)

(52) U.S. Cl.
  CPC ....... *B60Y 2200/91* (2013.01); *B60Y 2300/91* (2013.01); *G05D 2201/0213* (2013.01)

(56) References Cited

U.S. PATENT DOCUMENTS

| | | | |
|---|---|---|---|
| 9,121,718 B2* | 9/2015 | Uyeki | B60L 53/65 |
| 9,371,007 B1* | 6/2016 | Penilla | G06Q 20/145 |
| 10,025,277 B2* | 7/2018 | Miftakhov | B60L 53/52 |
| 2011/0191265 A1* | 8/2011 | Lowenthal | B60L 53/64 |
| | | | 705/412 |
| 2013/0096751 A1* | 4/2013 | Riley | B60L 53/63 |
| | | | 701/22 |
| 2013/0339072 A1* | 12/2013 | Touge | B60L 53/66 |
| | | | 705/5 |
| 2014/0028254 A1* | 1/2014 | Shane | B60L 53/14 |
| | | | 320/109 |
| 2014/0142770 A1* | 5/2014 | Sellschopp | B60L 53/62 |
| | | | 700/291 |
| 2015/0069970 A1* | 3/2015 | Sarkar | B60L 53/305 |
| | | | 320/109 |
| 2016/0236583 A1* | 8/2016 | Kamen | B60L 53/00 |
| 2016/0283919 A1* | 9/2016 | Taylor, III | G06Q 40/025 |
| 2018/0111494 A1* | 4/2018 | Penilla | G06Q 20/18 |
| 2019/0016384 A1* | 1/2019 | Carlson | B60W 30/00 |
| 2019/0039467 A1* | 2/2019 | Hortop | H02J 7/0072 |

* cited by examiner

US 11,135,937 B2

VEHICLE CHARGING LEVERAGING TELECOMMUNICATION INFRASTRUCTURE

RELATED APPLICATION

This application claims priority to U.S. Provisional Patent Appl. No. 62/654,159, filed on Apr. 6, 2018, entitled VEHICLE CHARGING LEVERAGING TELECOMMUNICATION INFRASTRUCTURE, by Ward, et al., the contents of which are incorporated herein by reference.

TECHNICAL FIELD

The present disclosure relates generally to computer networks, and, more particularly, to intelligent leveraging telecommunication infrastructure to charge vehicles.

BACKGROUND

Electric vehicles are becoming more and more ubiquitous and provide a number of benefits over that of petroleum-fueled vehicles. First, unlike petroleum-fueled vehicles, purely electric vehicles have zero tailpipe emissions. This lack of pollution can have a considerable effect on the environment and can reduce or even eliminate certain environmental conditions, such as smog in an urban environment. Second, electric vehicles allow for a greater number of energy sources to be utilized. For example, an electric vehicle can be charged using electricity generated by any number of energy sources such as solar, nuclear, hydroelectric, and the like.

While electric vehicles have certain advantages over those of petroleum-fueled vehicles, transitioning the word's fleet to electric vehicles is not without difficulty. Notably, while there are many fueling stations for petroleum-fueled vehicles, there are still a comparatively sparse number of charging stations for electric vehicles. For many parts of the country, the lack of charging station availability has hindered electric vehicle adoption. However, as the number of charging stations continues to grow, so too will the number of electric vehicles in use.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
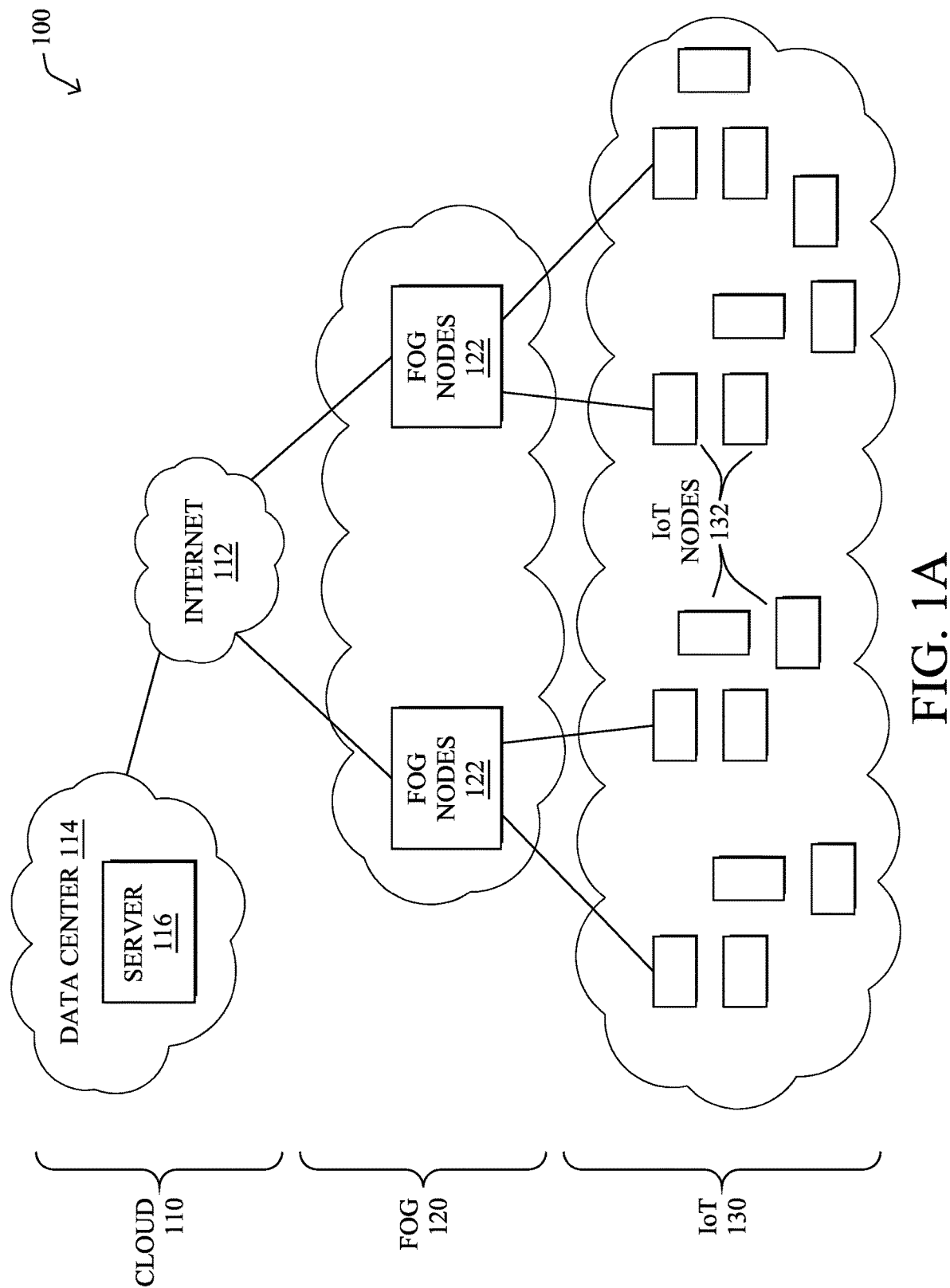
FIGS. 1A-1B illustrate an example computer network.

According to one or more embodiments of the disclosure, an electric vehicle sends a vehicle charging request to a supervisory service. The electric vehicle receives, from the supervisory service in response to the vehicle charging request, a location of a telecommunication node of a telecommunication network that is configured to provide charging to electric vehicles. The electric vehicle navigates to the received location of the telecommunication node. The vehicle initiates charging of the electric vehicle at the location of the telecommunication node.

In further embodiments, a supervisory service receives a vehicle charging request from an electric vehicle. The supervisory service selects, based on the vehicle charging request, a location of a telecommunication node of a telecommunication network that is configured to provide charging to electric vehicles. The supervisory service sends an indication of the selected location of the telecommunication node to the electric vehicle. The supervisory service authorizes the electric vehicle to begin charging at the location of the telecommunication node.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
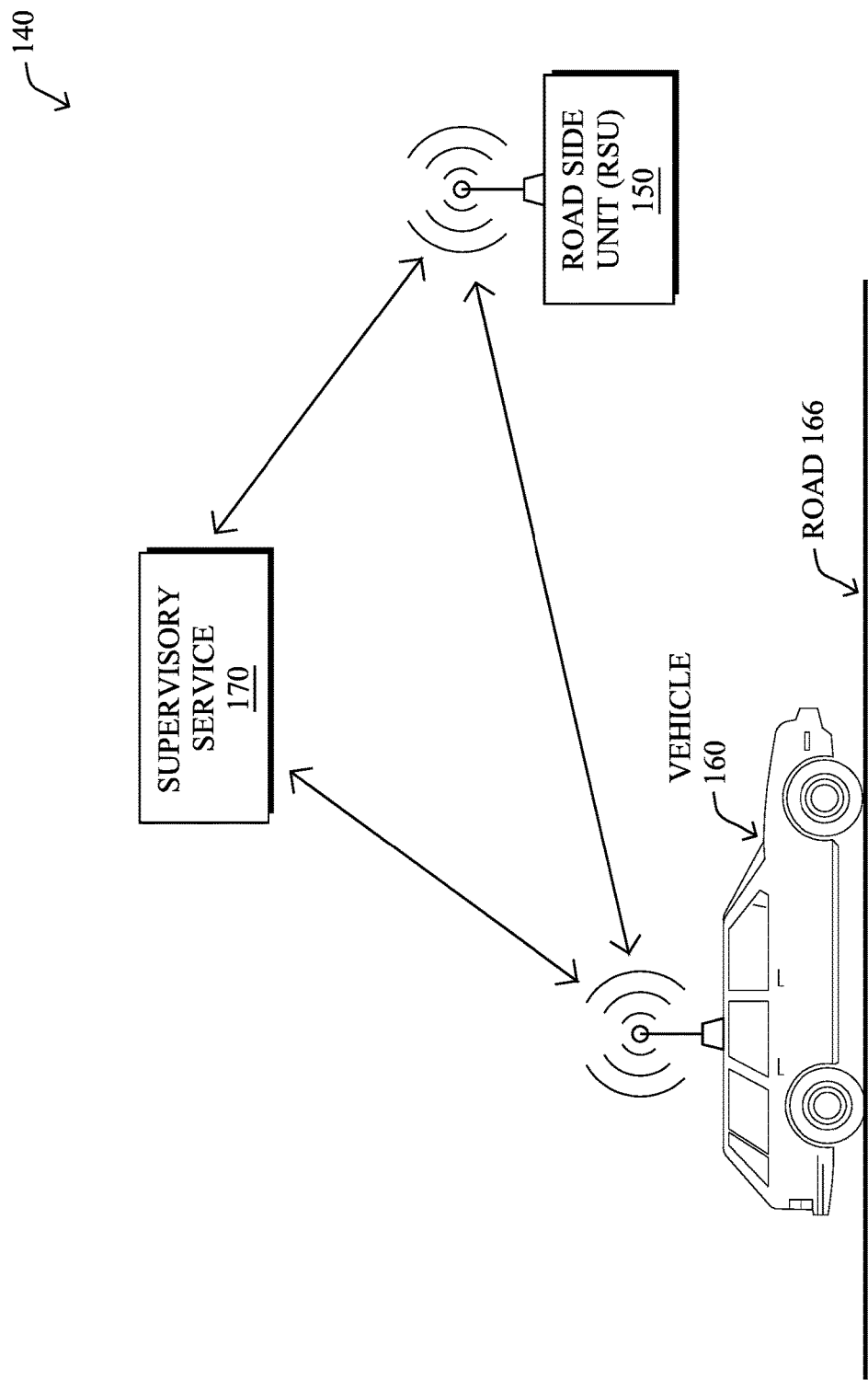

FIG. 1B illustrates an example roadside communication system 140, according to various embodiments. In particular, system 140 may include any or all of the following components: a vehicle 160, a roadside unit (RSU) 150, and/or a remote supervisory service 170. During operation, system 140 may be operable to relay data to vehicle 160 and/or to convey data from vehicle 160 to supervisory service 170.

In some embodiments, roadside communication system 140 may be a specific implementation of network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or charging mechanisms. For example, in some embodiments, vehicle 160 may include a charging port configured to receive charge via a charging cord. In further embodiments, vehicle 160 may be equipped with one or more charging coils, to enable wireless power transfer (WPT) to the battery of vehicle 160. For example, such charging coils may be located on the bottom of vehicle 160 and inductively couple with one or more ground-based coils, thereby transferring charging power to the vehicle.

Vehicle 160 may also be a manually controlled, semi-autonomous, or fully autonomous electric vehicle, in various cases. By convention, the degree of autonomous control is labeled on a scale from 'Level 0' (i.e., no automation, thus requiring full driver control) to "Level 5" (i.e., full automation). Further, while vehicle 160 is depicted as a passenger car in the Figures, the techniques herein are not limited as such and vehicle 160 can comprise a truck, bus, boat, aerial vehicle, or the like.

Figure 2:
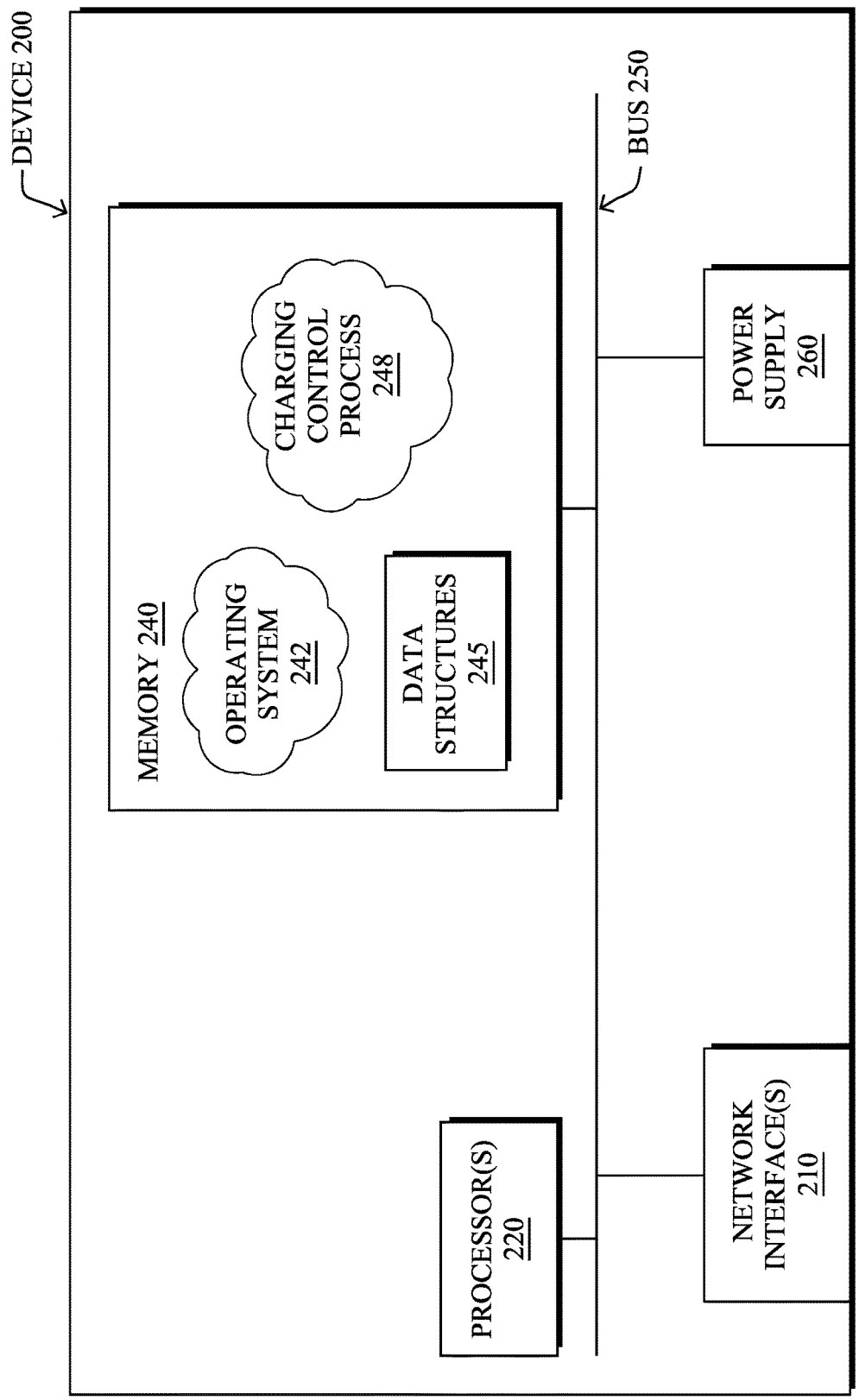
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative charging control process 248, as described herein.

In general, charging control process 248 may be configured to control the charging of an electric vehicle. In some embodiments, charging control process 248 may do so by leveraging machine learning, to optimize the charging process. For example, charging control process 248 may use machine learning to select the optimal charging station for a given vehicle, the optimal path and driving parameters to direct the vehicle to the selected station, scheduling of the charging (e.g., assigning a vehicle to a particular charging space for a certain amount of time, optimizing the flow of vehicles through the charging station, etc.), and/or the parameters used during charging (e.g., power transfer rate, etc.). In general, machine learning is concerned with the design and the development of techniques that take as input empirical data (such as the charging history of the vehicle, the charging profile of the vehicle, the provided charge of the coil, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, charging control process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle, location data for vehicles requiring charging, etc. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that charging control process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, the increasing availability and adoption of electric vehicles goes hand in hand with the availability of vehicle charging stations. However, and especially in the case of more sparsely populated areas, this may entail reconfiguring the power grid to support the new charging stations, which may not be feasible, in some cases.

——Vehicle Charging Leveraging Telecommunication Infrastructure——

In certain aspects, the techniques herein propose leveraging existing telecommunication (telco) infrastructure for purposes of charging electric vehicles. In particular, the techniques herein leverage the fact that certain telco equipment, such as fiber optic repeaters, amplifiers, and the like, are already connected to the power grid and are configured to provide nearly uninterrupted service.

Specifically, according to various embodiments, an electric vehicle sends a vehicle charging request to a supervisory service. The electric vehicle receives, from the supervisory service in response to the vehicle charging request, a location of a telecommunication node of a telecommunication network that is configured to provide charging to electric vehicles. The electric vehicle navigates to the received location of the telecommunication node. The vehicle initiates charging of the electric vehicle at the location of the telecommunication node.

Illustratively, the techniques described herein may be performed by hardware, software, and/or firmware, such as in accordance with the illustrative charging control process 248, which may include computer executable instructions executed by the processor 220 (or independent processor of interfaces 210) to perform functions relating to the techniques described herein.

Figure 3A:
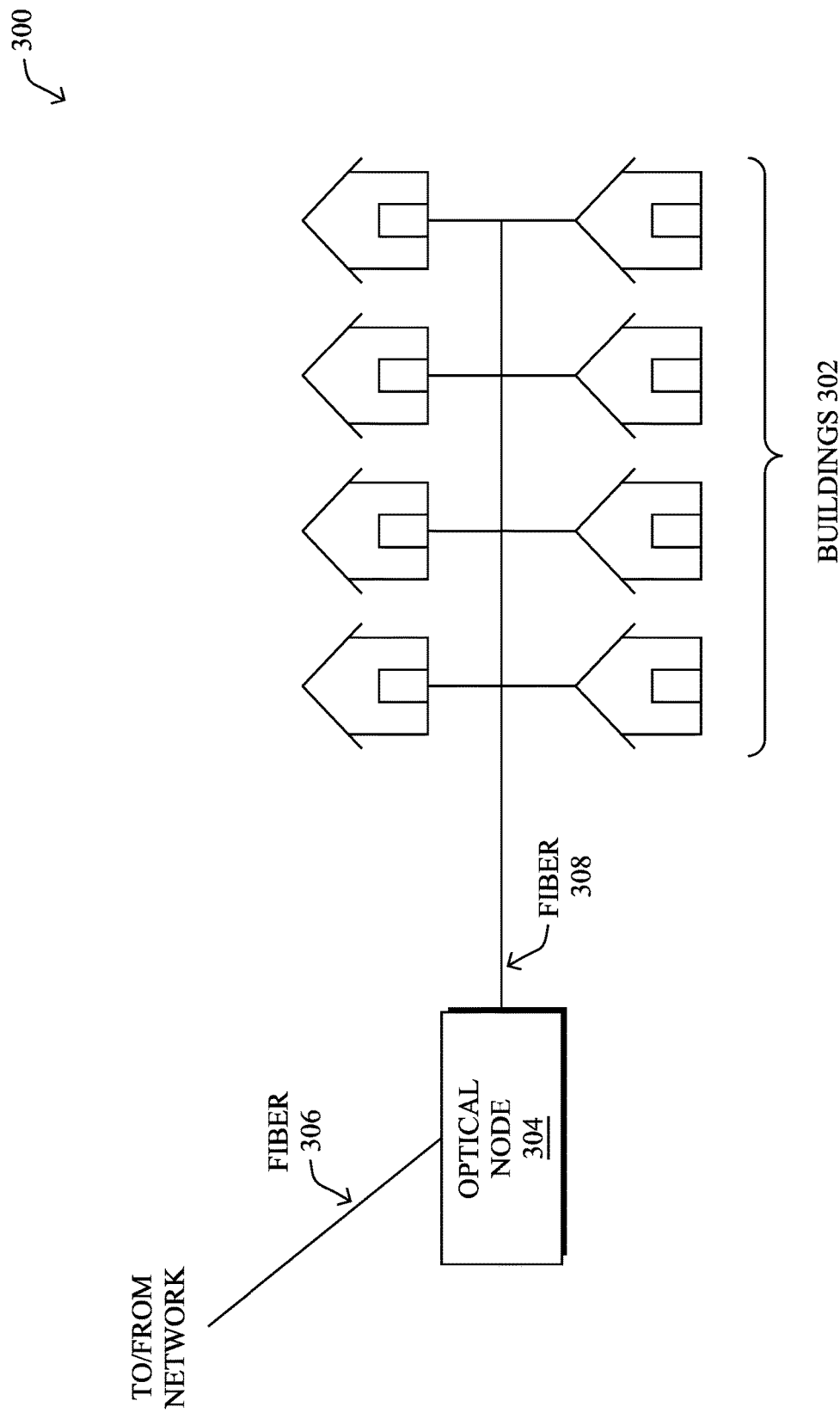
FIGS. 3A-3B illustrate example portions of a telecommunications infrastructure.
Figure 3B:
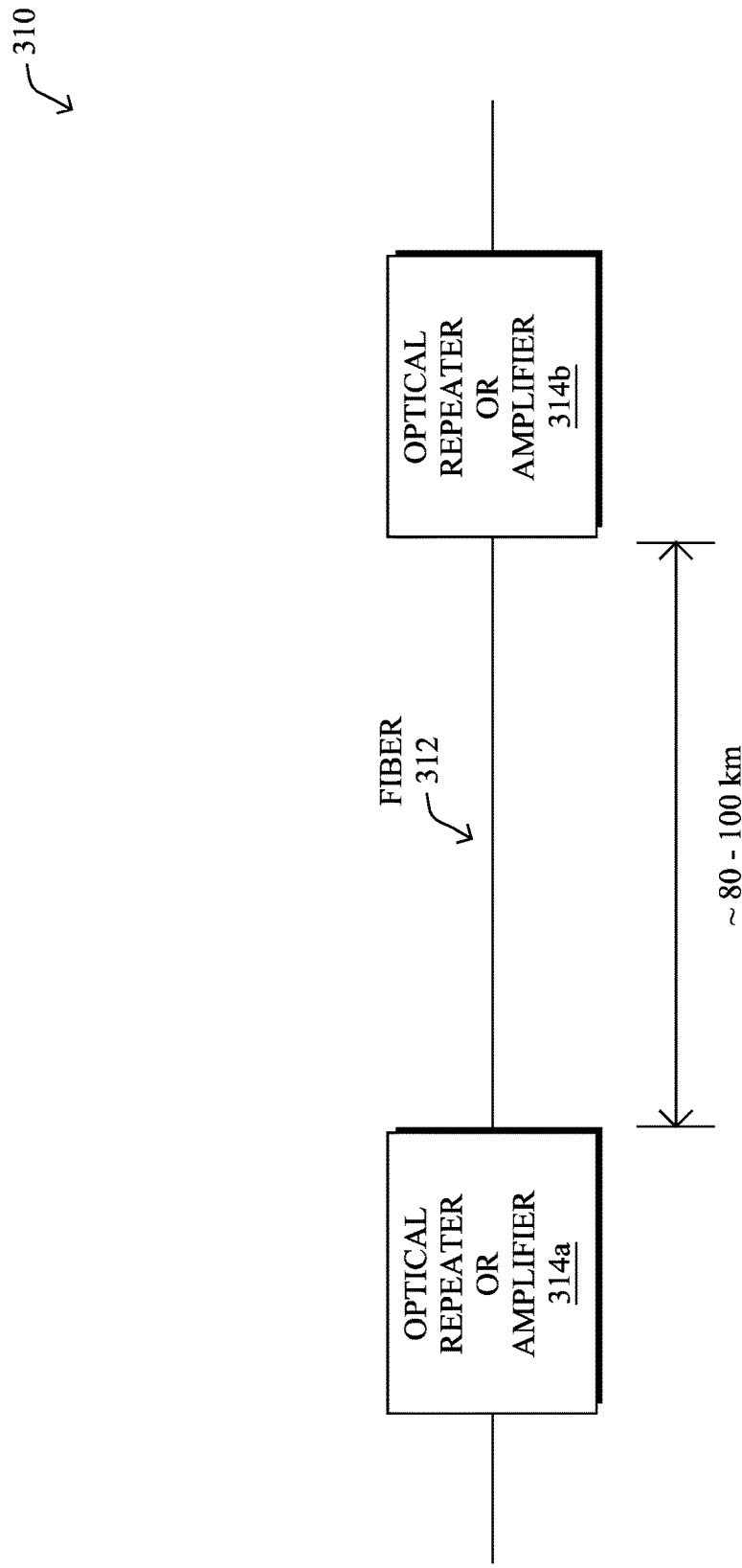

Operationally, FIGS. 3A-3B illustrate example portions of telecommunications infrastructure that can be leveraged for vehicle charging, according to various embodiments. Generally speaking, existing telco networks often span hundred, if not thousands, of miles, drawing power from the electric grid along the way. Two scenarios of this are illustrated in FIGS. 3A-3B.

In FIG. 3A, a portion 300 of a telecommunication network is shown near customer endpoints. In a typical hybrid fiber coaxial (HFC) network, for example, a set of buildings 302 (e.g., residential buildings, commercial buildings, etc.) may be connected via coaxial cabling 308 to an optical node 304. In turn, optical node 304 may be connected to the deeper portions of the network via fiber optic cabling 306 (e.g., to connect optical node 304 to an optical ring of the telecommunication network). Generally speaking, optical node 304 serves to limit the run of coaxial or other cabling between the fiber optic network and buildings 302. During operation, optical node 304 converts the light-based signals conveyed via fiber optic cabling 306 into electric signals for forwarding to buildings 302 via coaxial cabling 308, and vice-versa.

FIG. 3B illustrates another portion 310 of a telecommunication network. Deeper in the network that may be purely fiber optic, there may be other telecommunication equipment that enables optical signals to be conveyed over long distances. Notably, modern fiber optic cabling affords a maximum transmission distance without the use of repeaters or amplifiers in the range of approximately 80-100 kilometers (km). Thus, as shown in network portion 310, fiber optic cabling 312 in a telecommunication network may be interspersed with any number of optical repeaters or amplifiers, such as repeaters or amplifiers 314a-314b.

In order to provide the most reliable service possible to users, telco nodes, such as optical nodes (e.g., optical node 304), e.g., optical repeaters, optical amplifiers, or the like, may be connected to the electric grid and may even be equipped with backup power supplies, such as generators or battery backup systems. In other words, these telco nodes, which may already be distributed throughout the majority of a region, are already integrated into the power grid and afford a unique opportunity to also support charging stations for electric vehicles. Notably, most telco nodes are already situated at roadside locations, to afford ease of access. In other cases, telco nodes may also be situated along railways and/or waterways, allowing for the charging of other forms of electric vehicles (e.g., trains, boats, etc.), as well. Additionally, some existing telco nodes can pull upwards of 1,000 kW from the grid, which could greatly reduce the amount of charging time of a vehicle (e.g., from 45 minutes down to 10 minutes).

Figure 4:
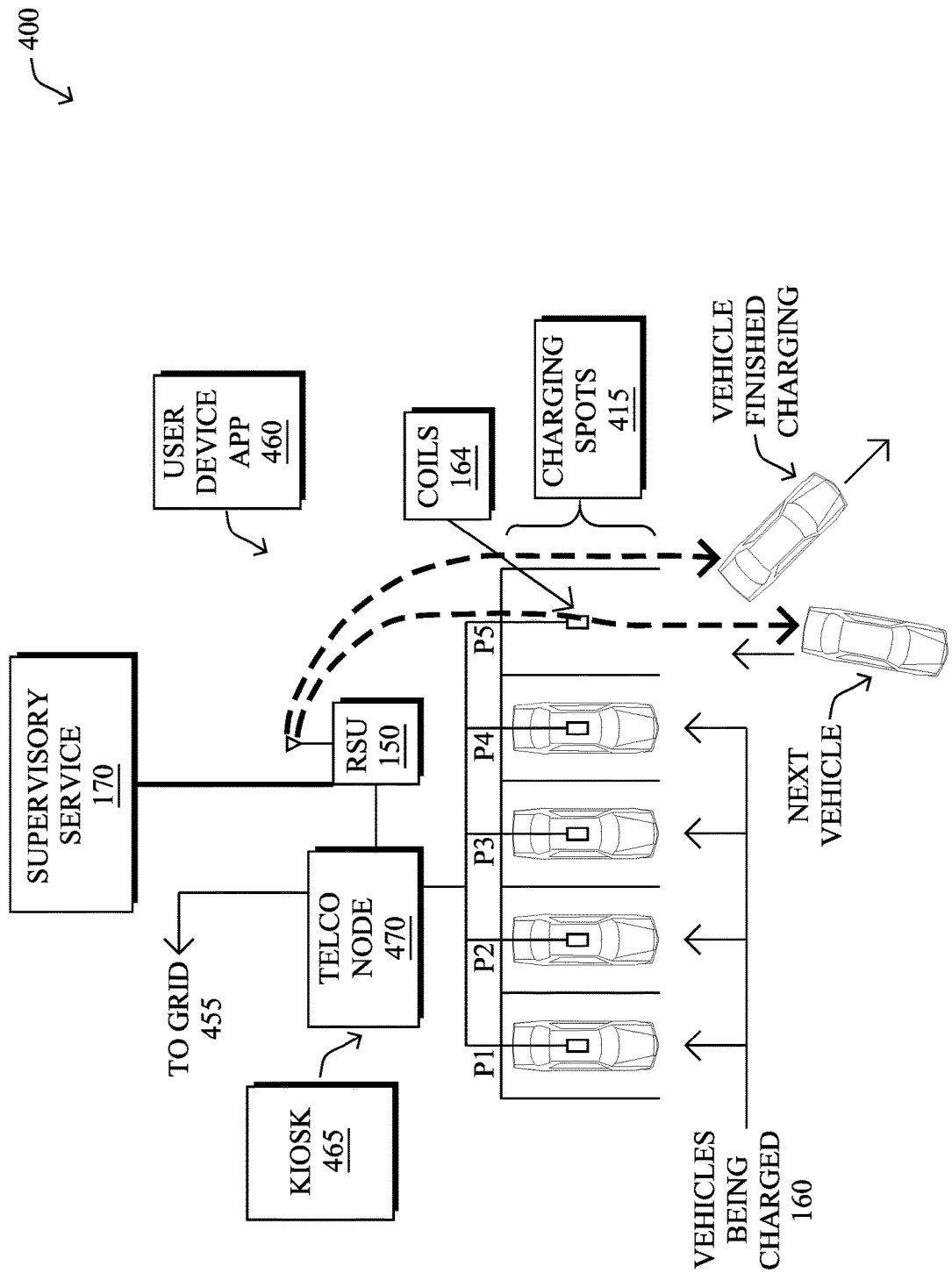
FIG. 4 illustrates an example telecommunication node-based vehicle charging station.

FIG. 4 illustrates an example telecommunication node-based vehicle charging station 400, in accordance with various embodiments. As noted, a key observation herein is that pre-existing telco nodes, such as telco node 470 shown, may already be connected to a power grid 455. The equipment associated with such a node, in various embodiments, can be adapted to also provide charging to any number of electric vehicles 160. For example, as shown, a parking lot may be installed at the location of telco node 470 and comprise any number of parking spaces/spots, such as parking spaces P1-P5. The entire set of parking spaces, or a portion thereof, may be outfitted to operate as charging spots 415 at which a vehicle 160 can receive charge.

Actual charging of vehicles 160 may entail the modified telco node 470 conveying power from grid 455 to vehicles 160 via their charging mechanisms. For example, each charging spot 415 may include a kiosk or other terminal from which a power cable can be connected to the vehicle, thereby transferring power from grid 455 to the parked vehicle 160. In further embodiments, as shown, each charging spot 415 may be equipped with one or more ground-based charging coils 164. When the charging coils 164 of a charging spot 415 is energized, one or more charging coils located on the underside of the vehicle 160 may receive charge through inductive coupling of the ground-based and vehicle-based coils.

Charging station 400 may also include a communication system that provides connectivity between the various components shown. For example, charging station 400 may also include one or more RSUs 150 that communicate with vehicles 160. In other cases, vehicle to infrastructure (V2I) communication can be accomplished via cabling, such as a communication cable integrated into a charging cable. As noted, RSU 150 may relay communications between a vehicle 160 and supervisory service 170 that may oversee some or all of the operations of charging station 400. For example, RSU 150 may also be in communication with the equipment of telco node 470 and provide control commands thereto, to regulate the flow of power from grid 455 to a given charging spot 415. The presence of RSU 150 at charging station 400 also allows RSU 150 to operate as a fog computing node, thereby allowing for the download of updates to a charging vehicle 160, perform diagnostics and other analytics on data from the vehicle, or the like.

In certain embodiments, where users are present, a user application 560, such as on a user's smartphone or vehicle dashboard may be used for user interaction as described herein (e.g., via RSU 150 or an alternate network, such as a cellular network). Alternatively, or in addition thereto, a nearby parking kiosk 465 can also be used for such user interactions. These user interactions may generally allow the driver of a vehicle 160 to request and initiate vehicle charging, provide payment for the charging, receive status updates (e.g., an estimated time to charge), and/or provide other functions.

According to one or more aspects of the embodiments herein, the above elements may collectively be configured to gather any or all of the following information, making use of techniques such as sensor fusion and/or fog or cloud computing:

1) Data from the charging station 400:
whether vehicle is currently charging;
whether charging is complete;
power transfer rate;
space assignments and queue states;
and so on.
2) Data from app 460, vehicle 160, and/or kiosk 465:
vehicle make;
vehicle model;
vehicle registration information;
unique vehicle identifier;

battery capacity;
authentication information;
financial payment information;
location;
vehicle sensor information (e.g., Lidar, cameras, GPS, etc.);
when the owner expects to pick up his/her vehicle;
how much charge the owner wants or is required by the vehicle;
etc.
3) Data regarding current lot state from other sources:
location of other vehicles;
data from other vehicles;
data from other sensors (e.g., cameras, etc.);
etc.
4) Information (present & future) from energy providers:
cost of energy;
availability of energy;
etc.

More specifically, charging of a vehicle 160 may be initiated and controlled, in part, through the interactions of a vehicle and supervisory service 170. For example, once positioned in an available charging spot 415, the vehicle 160 may send a charging request to supervisory service 170. Such a request may include any or all of the above data, to allow supervisory service to authenticate the requesting vehicle 160 and to authorize the charging of the vehicle. Alternatively, if the user requests charging from supervisory service 170 via kiosk 465, app 460, or the like, supervisory service 170 may poll the vehicle 160 for its data, to authenticate vehicle 160 and authorize the charging of the vehicle.

During authentication and authorization of a vehicle 160 for charging, supervisory service 170 may use the data received in the charging request and/or pulled from the vehicle 160, to first verify the identity of the vehicle. For example, the vehicle 160 may send a unique identifier, such as a cryptographic token, to supervisory service 170. In turn, supervisory service 170 can use this identification information to retrieve the account information associated with the vehicle 160 and, in some cases, historical charging information for vehicle 160 that supervisory service 170 can use to control the charging of the vehicle 160. For example, supervisory service 170 may use the charging history of vehicle 160 to determine the optimal charging parameters for the vehicle (e.g., power transfer rate, coil alignment or height, etc.).

According to various embodiments, supervisory service 170 may use machine learning to enhance the various charging functions described herein. In one embodiment, supervisory service 170 may use machine learning to coordinate the charging of vehicles 160, such as by scheduling and assigning vehicles 160 to charging spots 415. If vehicles 160 are also autonomous vehicles, supervisory service 170 can also provide automated control over vehicles 160, to automate the movements of vehicles into and out of charging spots 415. If charging spots 415 comprise charging coils, supervisory service 170 can also provide automated control over the powering of the coils, to provide charge to the vehicle 160.

Another potential use for machine learning is the ability to learn the ideal charging parameters for a given vehicle 160, in further embodiments. Notably, different vehicles 160 may have different charging capabilities and requirements. By leveraging machine learning, the optimal parameters can be learned either at the vehicle level, at the fog level (e.g., RSU 150), and/or at the cloud level (e.g., supervisory service 170), and then applied during charging of the vehicle 160. For example, coil alignment and separation can affect the percentage of energy transferred to the vehicle 160. By maintaining a history of coil positions and charging rates, and using this information as input to a machine learning model, supervisory service 170 can predict the charging parameters that would optimize the transfer.

Figure 5:
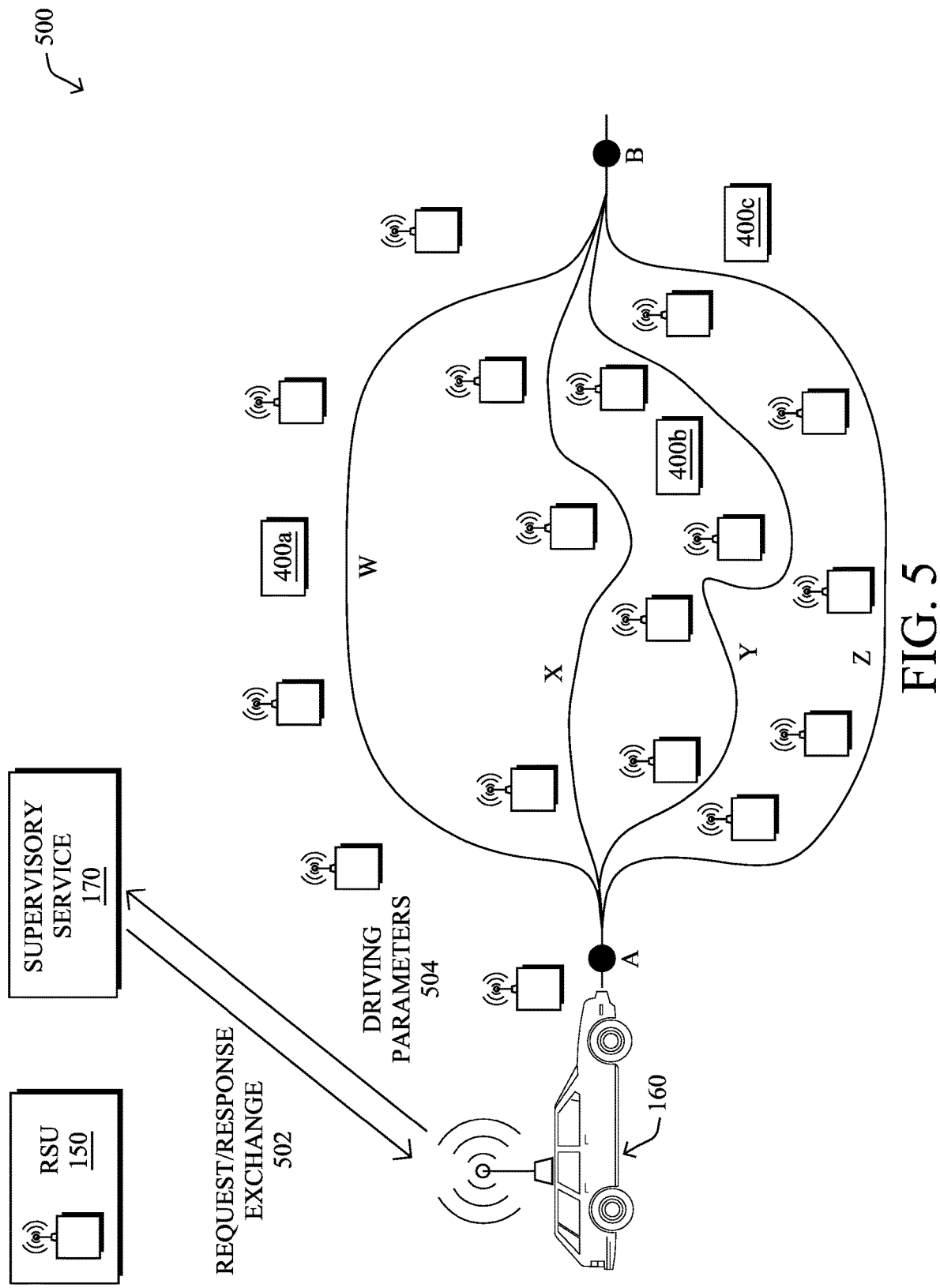
FIG. 5 illustrates an example of a vehicle being routed to a telecommunication node-based vehicle charging station.

FIG. 5 illustrates an example of a vehicle 160 being routed to a telecommunication node-based vehicle charging station 400, according to various embodiments. For purposes of illustration, assume that vehicle 160 is faced with a number of different routes (e.g., routes W, X, Y, and Z) that are located between points A and B. Along some of these routes, and potentially at different distances from point A, may be telecommunication node-based charging stations 400. For example, station 400a may be located along route W, station 400b may be located along route Y, and station 400c may be located along route Z. Also, any number of RSUs 150 may be located along the various routes, thereby allowing vehicle 160 to communication with supervisory service 170. Alternatively, as would be appreciated, vehicle 160 may leverage an existing cellular, satellite, or other wireless network to communicate with supervisory service 170.

In some embodiments, vehicle 160 may perform a request/response exchange 502 with supervisory service 170. During this exchange, vehicle 160 may convey data regarding its charging needs, current location, etc. to supervisory service 170 as part of a vehicle charging request. Note that vehicle charging request may be sent on demand (e.g., if the driver of vehicle 160 wishes to charge vehicle 160) or automatically, such as when the charge of vehicle 160 dips below a threshold.

In response to receiving a charging request from vehicle 160, supervisory service 170 may select a charging station based on the received charging request. For example, supervisory service 170 may assess the current charge of vehicle 160, the current location of vehicle 160, and any other information available to service 170, to select a particular telecommunication node-based charging station 400 for use by vehicle 160. In some embodiments, supervisory service 170 may also select a route to the charging station 400 selected for use by vehicle 160. For example, supervisory service 170 may select route W, and charging station 400a, for use by vehicle 160.

During request/response exchange 502, supervisory service 170 may provide driving parameters 504 to vehicle 160 that, at minimum, indicates the location of the selected telecommunication node-based charging station 400. In some embodiments, driving parameters 504 may also include the selected route to the selected telecommunication node-based charging station 400. For example, as shown, driving parameters 504 may indicate that vehicle 160 is to travel along route W.

In various embodiments, vehicle 160 may navigate to the selected charging station 400 autonomously, semi-autonomously, or via manual control by the driver, based on the received driving parameters 504. For example, in the case in which vehicle 160 is an autonomous vehicle, the returned driving parameters 504 can be used to automatically direct vehicle 160 to its selected station 400. Conversely, if the driver of vehicle 160 is in control, driving parameters 504 can be conveyed to the driver via a user interface, such as a display, speaker, or the like.

In one embodiment, supervisory service 170 may use machine learning to optimize the route and station assignments of the various vehicles in the area taking into account, for example, the number of vehicles in the area, the estimated charging times of the vehicles, the vehicle capacities of the charging stations 400, etc. In further cases, the route and station assignment models may also take into account the specific charging needs of vehicle 160, as reported via its charging request sent to supervisory service 170. For example, if vehicle 160 is in dire need of charge, the optimization may still take this into account, even if doing so would not be ideal from a traffic standpoint.

Figure 6:
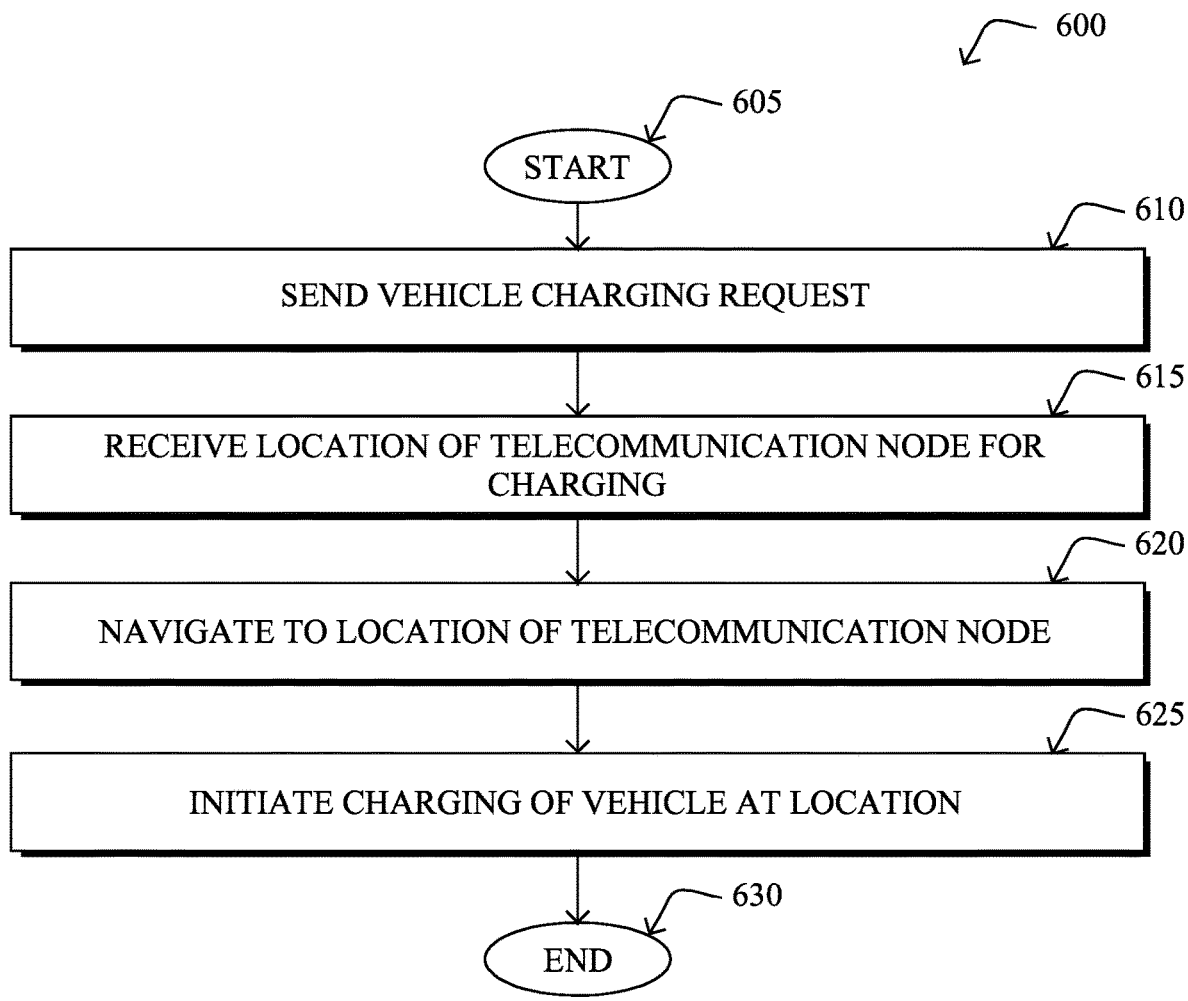
FIG. 6 illustrates an example simplified procedure for charging an electric vehicle at the location of a telecommunication node.

FIG. 6 illustrates an example simplified procedure for charging an electric vehicle at the location of a telecommunication node, in accordance with one or more embodiments described herein. For example, a non-generic, specifically configured device (e.g., device 200) may perform procedure 600 by executing stored instructions (e.g., process 248), such as an onboard controller of a vehicle. The procedure 600 may start at step 605, and continues to step 610, where, as described in greater detail above, the vehicle may send a vehicle charging request to a supervisory service. Such a charging request may indicate, for example, a location of the vehicle, data indicative of the charging needs of the vehicle (e.g., current charge, max charge, etc.), estimated driving range left of the vehicle, authentication data for the vehicle (e.g., vehicle ID, token info., etc.), account information, and/or any other data regarding the vehicle.

At step 615, as detailed above, the vehicle may receive, from the supervisory service in response to the vehicle charging request, a location of a telecommunication node of a telecommunication network that is configured to provide charging to electric vehicles. As noted above, the locations of telecommunication nodes, such as optic repeaters and amplifiers of a fiber optic network, represent a unique opportunity for vehicle charging, as they are already tied to the electric grid and typically accessible. In some embodiments, the service may also provide driving directions as driving parameters to the selected location to the vehicle.

At step 620, the vehicle may navigate to the received location of the telecommunication node, as described in greater detail above. In some embodiments, if the vehicle is an autonomous vehicle, the vehicle may use the driving parameters to drive to the selected charging station location autonomously. In further embodiments, the vehicle may present the location of the selected location, and potentially driving directions thereto, via a display to the driver of the vehicle.

At step 625, as detailed above, charging of the electric vehicle is then initiated at the location of the telecommunication node. In some embodiments, the electric vehicle may send information to the supervisory service for purposes of authenticating the vehicle and authorizing charging by the charging station. For example, once the service has verified the identity of the vehicle, it may enable a ground-based charging coil at the selected location, or a corded power cord, to charge the vehicle. Procedure 600 then ends at step 630.

Figure 7:
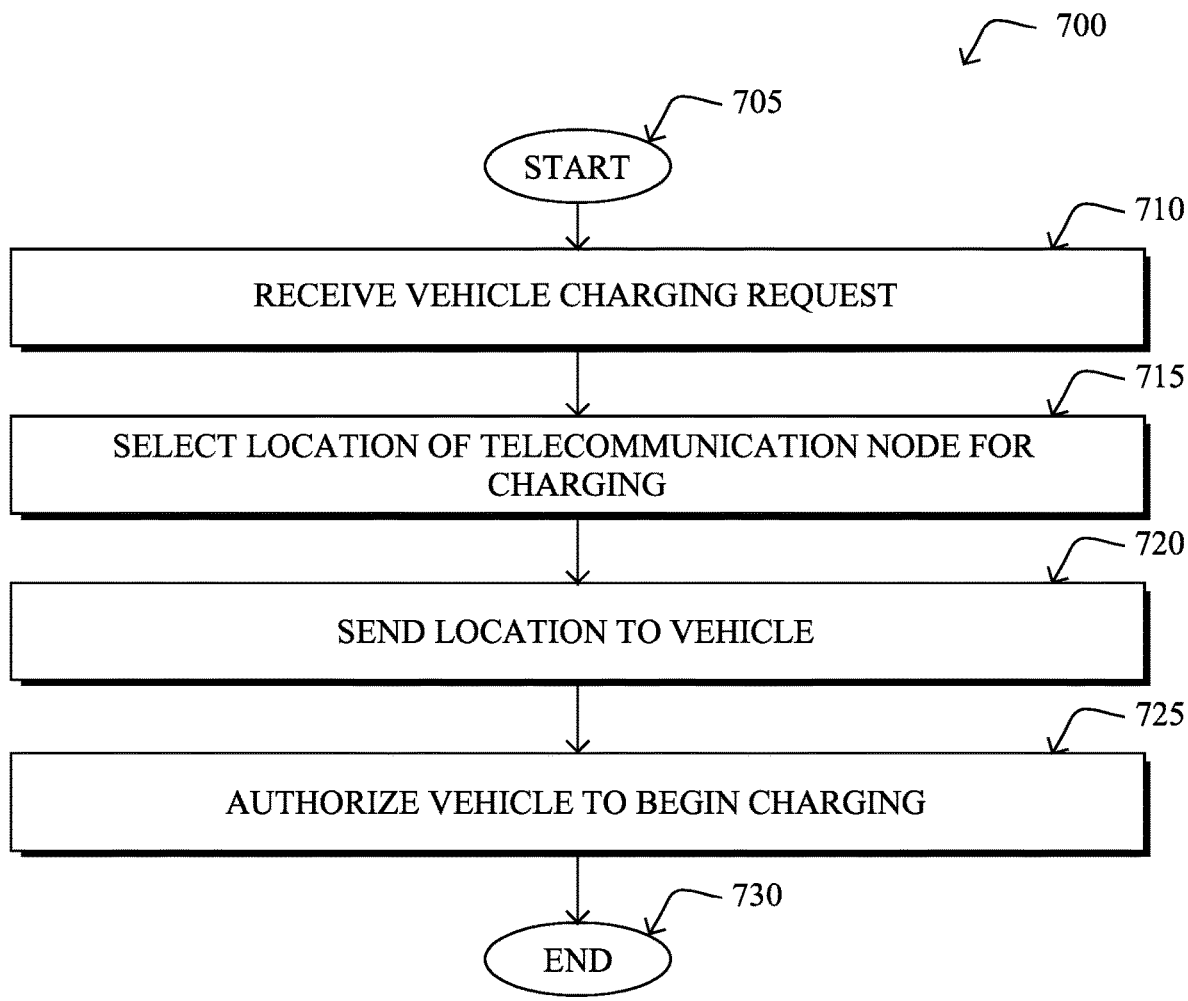
FIG. 7 illustrates an example simplified procedure for supervising charging of an electric vehicle.

FIG. 7 illustrates an example simplified procedure for supervising charging of an electric vehicle. The procedure 700 may start at step 705, and continues to step 710, where, as described in greater detail above, a supervisory service may receive a vehicle charging request from an electric vehicle. Such a request may indicate, for example, the current location of the electric vehicle, the charging requirements of the vehicle, authentication information, account information, or the like.

At step 715, as detailed above, the supervisory service may select, based on the vehicle charging request, a location of a telecommunication node of a telecommunication network that is configured to provide charging to electric vehicles. In some embodiments, the service may use a machine learning-based model to make the selection. For example, the model may select a charging station, and potentially a path of travel to the station, to minimize roadway and/or charging station congestion. Other factors that could affect the selection may include the distance that the vehicle is still able to travel, the account information associated with the vehicle, current roadway conditions, or the like.

At step 720, the supervisory service may send an indication of the selected location of the telecommunication node to the electric vehicle, as described in greater detail above. In some embodiments, the service may also send driving parameters to the vehicle indicative of a selected path to the location of the telecommunication node. For example, if the vehicle is an autonomous vehicle, the vehicle may use the driving parameters to autonomously navigate to the selected location.

At step 725, as detailed above, the supervisory service may authorize the electric vehicle to begin charging at the location of the telecommunication node. For example, the supervisory service may use data from the vehicle to authenticate the vehicle and determine any number of charging parameters for the vehicle (e.g., power transfer rate, coil alignment, etc.). In turn, the service may use these parameters to control the charging station at the location of the telecommunication node, to provide charge to the electric vehicle. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

Therefore, the techniques herein allow for the conversion of existing nodes of a telecommunication network into charging stations for electric vehicles. For example, optical repeaters, amplifiers, and the like, that are part of a fiber optic network are already connected to the power grid and include a number of features to ensure continuous service. By leveraging the locations of these nodes, as well as their existing infrastructure, electric vehicle charging stations can be rapidly deployed to many part of the country. Indeed, one can envision optical repeater or amplification sites being converted into the new "gas" stations of the future to provide charge to electric trucking fleets, passenger vehicles, and other forms of electric vehicles.

While there have been shown and described illustrative embodiments that provide for leveraging telecommunication infrastructure for purposes of vehicle charging, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like. Further, while the techniques herein are described primarily with respect to optical nodes, repeaters, amplifiers, etc., any other distributed telecommunication equipment that is already connected to the power grid can also be converted into electric vehicle charging stations, in accordance with the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
sending a vehicle charging request from an electric vehicle that requires charging to a supervisory service that is in communication with a telecommunication network;
receiving, at the electric vehicle and from the supervisory service in response to the vehicle charging request, a location of a telecommunication node of the telecommunication network, wherein the telecommunication node comprises: a) hardware to charge the electric vehicle and b) an optic repeater or optic amplifier for a fiber optic line of the telecommunication network;
navigating the electric vehicle to the received location of the telecommunication node; and
initiating charging of the electric vehicle at the location of the telecommunication node.

2. The method as in claim 1, further comprising:
receiving the charging of the electric vehicle via one or more ground-based charging coils installed at the location of the telecommunication node.

3. The method as in claim 1, wherein the electric vehicle is an autonomous vehicle.

4. The method as in claim 3, wherein navigating the electric vehicle to the received location of the telecommunication node comprises:
receiving driving parameters from the supervisory service, wherein the driving parameters indicate a path of travel to the location of the telecommunication node; and
controlling the autonomous vehicle to travel along the indicated path towards the location of the telecommunication node.

5. The method as in claim 1, wherein the supervisory service uses a machine learning-based model to select the location of the telecommunication node based on the vehicle charging request.

6. The method as in claim 1, wherein the vehicle charging request comprises one or more of: a location of the vehicle, a make of the vehicle, a model of the vehicle, or registration information for the vehicle.

7. The method as in claim 1, wherein initiating charging of the electric vehicle at the location of the telecommunication node comprises:
obtaining authorization from the supervisory service to begin the charging of the electric vehicle at the location of the telecommunication node.

8. A method comprising:
receiving, at a supervisory service, a vehicle charging request from an electric vehicle that requires charging to a supervisory service that is in communication with a telecommunication network;
selecting, by the supervisory service and based on the vehicle charging request, a location of a telecommunication node of the telecommunication network, wherein the telecommunication node comprises: a) hardware to charge the electric vehicle and b) an optic repeater or optic amplifier for a fiber optic line of the telecommunication network;
sending, by the supervisory service, an indication of the selected location of the telecommunication node to the electric vehicle; and
authorizing, by the supervisory service, the electric vehicle at the location of the telecommunication node.

9. The method as in claim 8, wherein selecting, based on the vehicle charging request, the location of the telecommunication node comprises:
using a machine learning-based model to select the location of the telecommunication node based on the vehicle charging request.

10. The method as in claim 8, wherein the electric vehicle is an autonomous vehicle.

11. The method as in claim 10, further comprising:
determining driving parameters for the autonomous vehicle indicate a path of travel to the location of the telecommunication node; and
sending the driving parameters to the autonomous vehicle, wherein the autonomous vehicle uses the driving parameters to autonomously travel along the indicated path towards the location of the telecommunication node.

12. An apparatus, comprising:
one or more network interfaces to communicate with a telecommunication network;
a processor coupled to the network interfaces and configured to execute one or more processes; and
a memory configured to store a process executable by the processor, the process when executed configured to:
send a vehicle charging request from an electric vehicle that requires charging to a supervisory service that is in communication with the telecommunication network;
receive, from the supervisory service in response to the vehicle charging request, a location of a telecommunication node of the telecommunication network, wherein the telecommunication node comprises: a) hardware to charge the electric vehicle and b) an optic repeater or optic amplifier for a fiber optic line of the telecommunication network;
navigate the electric vehicle to the received location of the telecommunication node; and
initiate charging of the electric vehicle at the location of the telecommunication node.

13. The apparatus as in claim 12, wherein the process when executed is further configured to:
receive the charging of the electric vehicle via one or more ground-based charging coils installed at the location of the telecommunication node.

14. The apparatus as in claim 12, wherein the electric vehicle is an autonomous vehicle.

15. The apparatus as in claim 14, wherein the apparatus navigates the electric vehicle to the received location of the telecommunication node by:

receiving driving parameters from the supervisory service, wherein the driving parameters indicate a path of travel to the location of the telecommunication node; and controlling the autonomous vehicle to travel along the indicated path towards the location of the telecommunication node.

16. The apparatus as in claim 12, wherein the supervisory service uses a machine learning-based model to select the location of the telecommunication node based on the vehicle charging request.

17. The apparatus as in claim 12, wherein the apparatus initiates charging of the electric vehicle at the location of the telecommunication node by:

obtaining authorization from the supervisory service to begin the charging of the electric vehicle at the location of the telecommunication node.

* * * * *